United States Patent [19]

Wasley et al.

[11] Patent Number: 4,926,129
[45] Date of Patent: May 15, 1990

[54] SENSOR ASSEMBLY FOR DETECTING MULTIPLE EVENTS AND DISTINGUISHING BETWEEN THEM

[75] Inventors: Robert S. Wasley, San Carlos; James C. Holmes, Redwood City, both of Calif.

[73] Assignee: Raychem Corporation, Menlo Park, Calif.

[21] Appl. No.: 256,874

[22] Filed: Oct. 12, 1988

[51] Int. Cl.[5] ............................................. G01R 31/00
[52] U.S. Cl. ..................................... 324/555; 324/525; 324/523; 340/605; 174/11 R
[58] Field of Search ............... 324/65 R, 65 P, 522, 324/525, 539–542, 551, 557; 340/602–605; 174/11 R, 115, DIG. 8; 73/40.5 R, 40 R; 200/61.04–61.06

[56] References Cited

U.S. PATENT DOCUMENTS

| | | | |
|---|---|---|---|
| 1,084,910 | 1/1914 | Stephenson | 324/523 |
| 2,581,213 | 1/1952 | Spooner | 177/311 |
| 2,691,134 | 10/1954 | Ford | 324/65 |
| 3,248,646 | 4/1966 | Brazee | 324/52 |
| 3,382,493 | 5/1968 | Loper, Jr. et al. | 340/244 |
| 3,470,340 | 9/1969 | Hakka | 200/61.04 |
| 3,564,526 | 2/1971 | Butts | 340/242 |
| 3,800,216 | 3/1974 | Hamilton | 324/52 |
| 3,991,413 | 11/1976 | Berger | 340/267 R |
| 4,029,889 | 6/1977 | Mizuochi | 174/11 R |
| 4,278,931 | 7/1981 | Huggins | 324/52 |
| 4,388,267 | 6/1983 | Tokarz | 324/65 R X |
| 4,400,663 | 8/1983 | May | 324/52 |
| 4,452,838 | 6/1984 | Veno | 174/DIG. 8 X |
| 4,570,477 | 2/1986 | Sugibuchi | 73/40.5 R |
| 4,605,923 | 8/1986 | Marshall | 340/604 |
| 4,663,614 | 5/1987 | Rauchwerger | 324/65 P X |
| 4,740,777 | 4/1988 | Slocum et al. | 340/604 X |

FOREIGN PATENT DOCUMENTS

| | | |
|---|---|---|
| 133748 | 4/1985 | European Pat. Off. . |
| 144211 | 6/1985 | European Pat. Off. . |
| 160440 | 11/1985 | European Pat. Off. . |
| 160441 | 11/1985 | European Pat. Off. . |
| 164838 | 12/1985 | European Pat. Off. . |
| 3011500 | 10/1981 | Fed. Rep. of Germany . |
| 3225742 | 2/1983 | Fed. Rep. of Germany . |
| 182339 | 7/1922 | United Kingdom . |
| 1355176 | 6/1974 | United Kingdom . |
| 1481850 | 8/1977 | United Kingdom . |
| WO86/07483 | 12/1986 | World Int. Prop. O. . |

Primary Examiner—Reinhard J. Eisenzopf
Assistant Examiner—Jack B. Harvey
Attorney, Agent, or Firm—Marguerite E. Gerstner; Timothy H. P. Richardson; Herbert G. Burkard

[57] ABSTRACT

A sensing assembly suitable for detecting both a first event which involves the presence of an electrolyte and a second event which does not involve the presence of an electrolyte, and for distinguishing between them. The assembly comprises a first conductor and a second conductor which is electrically insulated from the first conductor in the absence of both first and second events but becomes electrically connected to the first conductor by either an ionic connection in the presence of a first event or an electronic connection in the presence of a second event. The assembly also comprises a sensing apparatus of determining whether the connection is ionic or electronic. The assembly is useful for detecting leaks of hydrocarbons, e.g. gasoline, and water in storage tanks.

18 Claims, 1 Drawing Sheet

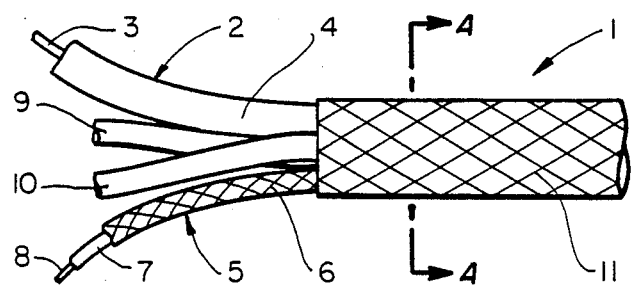
FIG_1
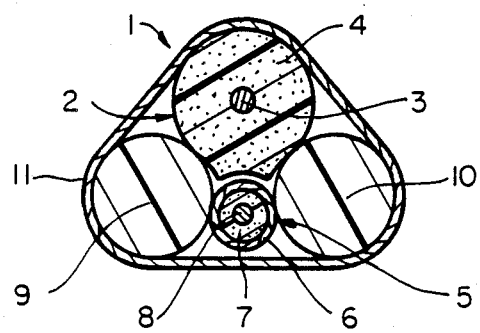
FIG_2
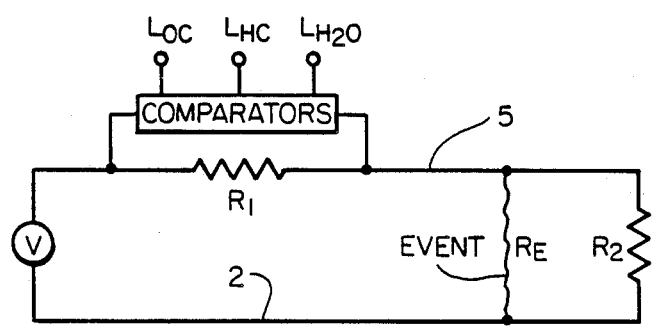
FIG_3

SENSOR ASSEMBLY FOR DETECTING MULTIPLE EVENTS AND DISTINGUISHING BETWEEN THEM

BACKGROUND OF THE INVENTION

1. Field of the Invention

This invention relates to sensor assemblies for detecting information about an event, particularly assemblies for distinguishing between multiple events.

2. Introduction to the Invention

Sensor cables and assemblies comprising them are well-known. Such sensors may be used to detect changes in variables along an elongate path, e.g. the presence of a liquid such as water or an organic solvent, the attainment of a predetermined temperature or pressure, the presence or absence of light or another form of electromagnetic radiation or a change in the physical position of a movable member, e.g. a valve in a chemical process plant or a window in a building fitted with a burglar alarm system. Changes of this kind are referred to in this specification by the generic term "event". Reference may be made, for example, to U.S. Pat. Nos. 1,084,910, 2,581,213, 2,691,134, 3,248,646, 3,382,493, 3,564,526, 3,470,340, 3,800,216, 3,991,413, 4,278,931, 4,400,663 and 4,570,477, U.K. Pat. Nos. 182,339, 1,355,176 and 1,481,850, German Offenlegungschriften Nos. 3,011,500 and 3,225,742, European Patent Application Publication Nos. 133,748, 144,211, 160,440, 160,441, and 164,838, and copending, commonly assigned application Ser. Nos. 838,725 published as International Patent Application No. WO 86/07483 (Lahlouh et al.) and 832,662 (Masia et al.) now abandoned in favor of a continuation application, Ser. No. 306,237, filed Feb. 7, 1989. The disclosures of each of the patents, applications, and other publications referred to above are incorporated herein by reference.

Sensors such as those described in the above publications are useful for detecting leaks from pipe lines, leaks from steam lines into thermal insulation surrounding such lines, and leaks from tanks containing corrosive or noxious chemicals. Such sensors are relatively slow to respond to the presence of a solvent, may be sensitive to flexing, pressure, or other mechanical abuse, and are subject to "nuisance tripping" in the presence of solvent vapors. An additional problem occurs when more than one liquid is present. For example, sensing means capable of distinguishing between a conductive liquid, e.g. water, and a nonconductive liquid, e.g. gasoline, are often required between the inner and outer walls of a dual wall containment tank. Conventional sensing apparatus is not designed for this purpose. Rather, several sensing wires, one pair for each liquid or event to be detected, must be used, eliminating flexibility and requiring complex electronics.

SUMMARY OF THE INVENTION

We have now found that a sensor assembly capable of detecting and distinguishing between two events can be made easily in a configuration which provides a rapid response, minimizes nuisance tripping in the presence of saturated vapors, and is physically robust. Thus the invention provides a sensor assembly for detecting a first event which involves the presence of an electrolyte and for detecting at least one second event which does not involve the presence of an electrolyte, and for distinguishing between the first and second events, the assembly comprising (1) a first conductor;
(2) a second conductor which
  (a) is electrically insulated from the first conductor in the absence of both first and second events,
  (b) becomes electrically connected to the first conductor upon occurrence of the first event through an ionic connection, and
  (c) becomes electrically connected to the first conductor upon occurrence of the second event through an electronic connection; and
(3) means for determining whether the connection between the first and second conductors is an ionic connection or an electronic connection.

BRIEF DESCRIPTION OF THE DRAWING

FIGS. 1 and 2 show a plan view and a cross-sectional view of a sensing cable of the invention; and FIG. 3 is a schematic circuit diagram of the sensor apparatus of the invention.

DETAILED DESCRIPTION OF THE INVENTION

The sensor assembly of the invention is useful for detecting a first event which involves the presence of an electrolyte. In this specification, the term "electrolyte" is used to mean a fluid, i.e. a liquid or gas, which creates an electrical connection by means of ions. Suitable fluids include water, aqueous acids, aqueous bases, and other ionic solutions. An ionic connection is one in which the charge-carrying entities are ions. Ionic connections frequently have a relatively high resistance, e.g. 40,000 ohms or higher.

The sensor assembly is also capable of detecting a second event which does not involve the presence of an electrolyte. Examples of such second events are (1) the presence of a fluid, e.g. an organic liquid such as a hydrocarbon, (2) an increase or decrease in temperature above or below a particular value, (3) an increase or decrease in pressure above or below a particular value, or (4) any combination of the above. The electrical connection made in the presence of a second event is electronic, not ionic, and commonly has a relatively low resistance, e.g. 1 to 1000 ohms.

The sensor assembly comprises a first conductor and a second conductor. While the assembly may comprise any configuration in which the first conductor is electrically insulated from the second conductor in the absence of both the first and second events, a preferred design is that in which the first and second conductors comprise elongate cables. Either the first or the second conductor or both may be covered with or comprise an electrically insulating layer which is removed, dissolved, converted to a conductive material, swelled, pierced, or in some way disturbed so that the first and second conductors may become electrically connected on the occurrence of the first or second event. Particularly preferred as an insulating layer is a braid or tape comprising apertures through which polymer surrounding or contacting one or both of the conductors can swell or liquid can permeate. The apertures may be of any size or shape, e.g. rectangular, diamond, or round. In order to maximize the rate of response and minimize the amount of "nuisance tripping" in the presence of vapors, many small apertures are preferred. They may be evenly or randomly spaced. The smallest dimension of the apertures is preferably in the range of 0.001 inch to 0.020 inch (0.0025 cm to 0.051 cm), for example about 0.003 inch to 0.006 inch (0.008 cm to 0.015 cm). The surface area of the apertures is preferably in the range of 0.000001 inch$^2$ to 0.0004 inch$^2$ (0.0000065 cm$^2$ to 0.0026 cm$^2$), for example about 0.000009 inch$^2$ to 0.000025 inch$^2$ (0.000058 cm$^2$ to 0.00016 cm$^2$). The depth of the apertures is preferably in the range 0.001 inch to 0.020 inch (0.0025 cm to 0.051 cm), for example 0.005 to 0.008 inch (0.013 cm to 0.020 cm).

The insulating layer may be formed by any suitable method, e.g. helically wrapping a slit tape around a conductor or applying a braid over a conductor. When, as is preferred, a braid is used, the filaments comprising the braid may comprise one or several materials in order to achieve appropriate physical and electrical properties. Suitable materials include nylon, glass, polyester, fluoropolymer, or other polymer monofilaments in the form of circular rods or rectangular ribbons. It is preferred that the material comprising the braid be deformable so that during the braiding operation, the tension is sufficient to flatten each monofilament at the point of crossover onto other filaments in order to produce a smooth, uniform surface layer. The braid or other electrically insulating layer may be present on either the first or the second conductor or both, or alternatively or in addition, it may be in contact with one or more support or filler rods which may form part of the sensor assembly.

Both the first and second conductors of the invention commonly comprise elongate wires, e.g. copper, nickel, platinum, or silver, or some combination or these. In some applications, either the first or the second conductor may comprise solder, which, at a particular temperature, melts and makes contact to the other conductor. Both conductors may be coated, partially or entirely, by a layer comprising polymer or other material. The first and second conductors may be arranged substantially parallel to one another in a substantially straight line, they may be twisted, they may be helically wrapped around a central support member, or otherwise positioned proximate to one another. For rapid response, it is preferred that the spacing between the first and the second conductors be relatively small, e.g. equal to the thickness of the insulating layer. The first and second conductors, as well as any support or filler rods, may be held in position by means of an outer braid which provides a tension on the components. When the sensor apparatus comprises electronics which are capable of both sensing and locating an event, one or more filler rods, comprising a central conductor, may be used in addition to the first and the second conductor in a three- or four-wire system. Such a sensing and locating system is disclosed in U.S. application Ser. No. 832,662 (Masia et al.) now abandoned in favor of a continuation application, Ser. No. 306,237, filed Feb. 7, 1989, the disclosure of which is incorporated herein by reference.

Although the first and the second conductors may comprise any material, it is preferred that at least one of them comprise a polymer which is capable of softening or swelling in the presence of solvent, temperature, or other event, and which may swell through or perturb the electrically insulating layer in order to contact the other conductor. Preferably the polymer comprises a conductive polymer, i.e. a mixture of a particulate conductive filler and an organic polymer (this term being used to include polysiloxanes), the filler being dispersed in the organic polymer. Any suitable conductive filler may be used, e.g. carbon black, graphite, metal, metal oxide, particles of conductive polymer, or a mixture thereof. A suitable resistivity level of the conductive polymer will vary depending on the application, but is commonly in the range 0.1 to 20,000 ohm-cm, particularly 1 to 1,000 ohm-cm, especially 1 to 250 ohm-cm. In the event that the polymer swells on use, the resistivity of the conductive polymer is measured prior to swelling. Documents describing conductive polymer compositions and their use in sensing apparatus include and copending, commonly assigned application Ser. Nos. 832,662 (Masia et al.) and 838,725 (Lahlouh et al.), the disclosures of which are incorporated herein by reference.

When it is desired that the polymer covering the conductor be swellable, any suitable material may be used. It may be an amorphous or a crystalline polymer or a mixture of these. The selection of the material depends on the event to be detected. For example, where the sensing apparatus is to be used to detect the presence of a particular fluid, a material must be selected which will swell in that liquid, but not in any other liquid which might also be present. The material may, however, be subject to changes other than swelling. For example, when, as is preferred in one particular embodiment, the sensor apparatus is capable of detecting a hydrocarbon and water, the polymer coating on at least one of the first and the second conductors may swell in the presence of the hydrocarbon, but will not swell in the presence of water. Rather an electrical connection will be made by means of ionic conduction from the first to the second conductor via the water.

In order to improve the stability of the sensing apparatus and limit its vapor and temperature sensitivity, it is sometimes desirable to crosslink the polymer coating on one or both conductors. Crosslinking may be achieved by the use of irradiation or chemical crosslinking agents. When the polymer is crosslinked by irradiation, it is preferred that the irradiation dose be 2 to 30 Mrads, particularly 5 to 15 Mrads, e.g. about 7.5 Mrads. The polymer may be irradiated to the same beam dose throughout its thickness or to different levels throughout its thickness. When the polymer comprises an amorphous material crosslinking is particularly preferred. It has been found that the resettability of the sensing apparatus, i.e. the ability of the sensing apparatus to be used repeatedly, is improved when the conductive polymer coating is irradiated.

As previously stated, the sensor apparatus may comprise any suitable geometry. In a preferred geometry, the first and second conductors are elongate and are held in position by a braid which is applied under tension. When the polymeric or other coating on at least one of the conductors softens or swells indicating the presence of an event, the tension on the braid aids in forcing the conductors into contact with one another.

Sensor apparatus of the invention is particularly useful in detecting and distinguishing between gasoline leaking out of and ground water leaking into a dual wall containment tank.

Referring now to the drawing, FIG. 1 illustrates a plan view of a sensing cable 1 of the invention and FIG. 2 shows a cross-sectional view along line A—A of FIG. 1. A first conductor 2 and a second conductor 5 as well as two spacer rods 9,10 are held in position by an outer braid 11. The first conductor 2 comprises a central conductor 3 surrounded by a conductive polymer layer 4. The second conductor 5 comprises a central conductor 8 surrounded first by a conductive polymer layer 7 and then by a layer of braid 6.

FIG. 3 shows a schematic circuit diagram of the sensing apparatus which is capable of indicating the presence of an open circuit, a hydrocarbon leak, or a water leak. The first conductor 2 and the second conductor 5 are connected in series to a power source V and two fixed resistors $R_1$, the "current-limiting" resistor, and $R_2$, the "end-of-line" resistor. The voltage measured across $R_1$ is proportional to the resistance in the circuit and is fed to a series of comparators, each of which is connected to a different indicating light. Under normal circumstances, the total resistance of the circuit, $R_T$, is fixed at $(R_1+R_2)$. If there is a break in the line, the resistance increases greatly and $L_{oc}$, the light indicating an open circuit, becomes lit. In the case of an event E, e.g. a water or hydrocarbon leak, an electrical connection with a resistance $R_E$ is created between the first and second conductors. Under these circumstances, $R_E$ is in parallel with $R_2$ and the total resistance of the circuit $R_T$ can be determined from the equation $$R_T = R_1 + \frac{R_2 R_E}{R_2 + R_E}$$

The type of event can be determined by the magnitude of $R_E$: a hydrocarbon leak will have a relatively low resistance, preferably 1 to 1000 ohms, e.g. 100 ohms, while an electrolyte such as water will have a relatively high resistance, preferably 4000 to 40,000 ohms, e.g. 10,000 ohms. Depending on the size of the resistance, the appropriate light will turn on: $L_{HC}$ lights in the presence of a hydrocarbon leak and $L_{H2O}$ lights in the presence of a water leak. (Other types of alarms, e.g. buzzers, may be used in place of lights.) Additional components, including one or two additional feedback wires, may be added if it is desirable to locate, as well as sense, the presence of the event.

The invention is illustrated by the following example.

EXAMPLE

A 0.050 inch (0.127 cm) layer of carbon-filled ethylene/propylene/diene polymer (EPDM) was extruded over a first 24 AWG stranded tin/copper conductor, and the polymer was then irradiated to 7.5 Mrad to produce a first electrode. A second electrode was prepared by extruding a 0.012 inch (0.030 cm) layer of carbon-filled polyvinylidene fluoride onto a 24 AWG stranded nickel/copper conductor. The second electrode was covered with a braid composed of sixteen strands of 0.003 inch (0.008 cm) spun polyester fiber at a density of 30 picks per inch. The first and second electrodes, as well as two 0.065 inch (0.165 cm) diameter polyethylene spacer rods, were covered with a braid composed of sixteen strands of 0.014 inch (0.036 cm) fluoropolymer monofilament. Under the tension of the braiding process, the first electrode, which comprised a relatively soft material, was deformed to give a noncircular cross-section. In the resulting sensor cable the first and second electrodes were separated by a small gap created by the polyester braid.

What is claimed is:

1. A sensor assembly for detecting a first event which involves the presence of an electrolyte and for detecting at least one second event which does not involve the presence of an electrolyte, and for distinguishing between the first and second events, the assembly comprising
   (1) a first conductor;
   (2) a second conductor which
      (a) is electrically insulated from the first conductor in the absence of both first and second events,
      (b) becomes electrically connected to the first conductor upon occurrence of the first event through an ionic connection, and
      (c) becomes electrically connected to the first conductor upon occurrence of the second event through an electronic connection;
   (3) means for determining whether the connection between the first and second conductors is an ionic connection or an electronic connection.

2. An assembly according to claim 1 wherein at least one of the first and the second conductors comprises a metal core in contact with a conductive polymer.

3. An assembly according to claim 2 wherein each of the first and the second conductors comprises a metal core in contact with a conductive polymer.

4. An assembly according to claim 2 wherein the metal core is surrounded by conductive polymer.

5. An assembly according to claim 2 wherein at least part of the conductive polymer has been crosslinked.

6. An assembly according to claim 5 wherein the polymer has been crosslinked by irradiation to a level of 2 to 3 Mrad.

7. An assembly according to claim 1 wherein the second conductor is insulated by means of an electrically insulating braid.

8. An assembly according to claim 7 wherein the braid comprises polyester.

9. An assembly according to claim 7 wherein the braid has apertures which have a smallest dimension of 0.001 inch to 0.020 inch.

10. An assembly according to claim 7 wherein the braid has apertures which have a depth of 0.001 to 0.020 inch.

11. An assembly according to claim 1 wherein the electrolyte is water.

12. An assembly according to claim 1 wherein the second event involves detecting the presence of an organic solvent.

13. An assembly according to claim 12 wherein the solvent is a hydrocarbon.

14. An assembly according to claim 1 wherein the second event involves detecting a change in temperature.

15. An assembly according to claim 1 wherein the second event involves detecting a change in pressure.

16. A method of detecting leaking fluid in a dual wall containment tank, said method comprising
   (1) positioning a sensor assembly between the inner and the outer wall of the dual wall containment tank, said sensor assembly being capable of detecting a first event which involves the presence of an electrolyte and detecting at least one second event which does not involve the presence of an electrolyte, and for distinguishing between the first and second events, said assembly comprising
      (a) a first conductor;
      (b) a second conductor which
         (i) is electrically insulated from the first conductor in the absence of both first and second events, (ii) becomes electrically connected to the first conductor upon occurrence of the first event through an ionic connection; and
(iii) becomes electrically connected to the first conductor upon occurrence of the second event through an electronic connection; and
(c) means for determining whether the connection between the first and second conductors is an ionic connection or an electronic connection; and
(2) connecting said assembly to a source of electrical power to allow monitoring of the assembly.

17. A method according to claim 16 wherein the first event involves detecting the presence of water and the second event involves detecting the presence of a hydrocarbon.

18. A method according to claim 17 wherein the hydrocarbon is gasoline.

* * * * *